United States Patent [19]

Esaki et al.

[11] Patent Number: 4,528,845

[45] Date of Patent: Jul. 16, 1985

[54] APPARATUS FOR DETECTING COMBUSTION TIMING

[76] Inventors: Michiru Esaki, 2, Uezono-cho, 2-chome, Meito-ku, Nagoya-shi, Aichi-ken; Yasuhiko Suzuki, 8, Yamane-cho, Tempaku-ku, Nagoya-shi, Aichi-ken, both of Japan

[21] Appl. No.: 563,799

[22] Filed: Dec. 21, 1983

[30] Foreign Application Priority Data

Dec. 22, 1982 [JP] Japan ............................... 57-230458

[51] Int. Cl.³ ............................................ G01M 15/00

[52] U.S. Cl. .................................. 73/119 A; 73/117.3

[58] Field of Search .................. 73/119 A, 117.3, 116, 73/35

[56] References Cited

U.S. PATENT DOCUMENTS 4,337,648 7/1982 Gillespie ....................... 73/119 A X 4,373,384 2/1983 Olson et al. ...................... 73/119 A

*Primary Examiner*—Jerry W. Myracle

*Attorney, Agent, or Firm*—Oblon, Fisher, Spivak, McClelland & Maier

[57] ABSTRACT

The apparatus for detecting combustion timing includes: a microwave unit for generating a microwave of a predetermined frequency by a microwave oscillator and detecting the received microwave to convert the same into a low frequency signal; a probe comprising a microwave sensor for radiating the microwave into a combustion chamber and receiving a reflected wave and a light sensor for electrically detecting the light emitted upon combustion; and a processing unit comprising a peak detector unit for detecting peaks of the microwave signal, a luminous signal processor unit for detecting a peak value of the first peak of a luminous signal supplied by the light sensor in each cycle and also detecting the time when the luminous signal reaches an intensity having a predetermined proportion to the first peak value thereof, and an operating unit for operating a time difference between a midpoint between peaks of the microwave signal and the time when the luminous signal reaches an intensity having a predetermined proportion to the first peak value thereof. The apparatus detects combustion timing in an internal combustion engine with high accuracy.

19 Claims, 4 Drawing Figures

APPARATUS FOR DETECTING COMBUSTION TIMING

BACKGROUND OF THE INVENTION

1. Field of the Invention

The present invention relates to an apparatus for detecting combustion timing in which the timing for starting the combustion in an internal combustion engine is detected based on a microwave signal and a luminous signal.

2. Description of the Prior Art

Accurate detection of conditions in the combustion chambers, the top dead center position, and timing for fuel injection, ignition and firing with respect to the top dead center while the engine is in operation is highly desired in internal combustion engines for the improved exhaust emission and fuel economy and also for analyzing combustion therefor. Reflecting the recent trend for more delicate combustion control, there is a strong demand on production lines for an apparatus capable of accurately and simply determining whether manufactured internal combustion engines inject fuel and effect ignition, firing or combustion at desired timing or angle with respect to the top dead center.

More and more diesel engines are used on passenger cars in view of fuel cost but since diesel engines found widerspread use much later than gasoline engines and fail to provide ready information for the detection, more need has arisen particularly recently therefor.

In view of the foregoing, the present inventors have already proposed and filed an application directed to an apparatus for detecting the combustion timing with respect to the top dead center by utilizing the phenomenon of microwave resonance to detect the top dead center and by detecting the light emitting phenomenon upon combustion in the combustion chamber by use of a light sensor (U.S. application Ser. No. 496,656 filed on May 20, 1983).

SUMMARY OF THE INVENTION

It is an object of this invention to rearrange and simplify the signal processing in the above-mentioned apparatus provided by the present inventors, to thereby improve the accuracy and reliability, as well as to simplify the apparatus.

Another object of the present invention is to enable the checking for the performance and the abnormality detection of the sensor and the microwave oscillator to be used.

The apparatus for detecting combustion timing according to this invention comprises: a microwave unit for generating a microwave of a predetermined frequency by a microwave oscillator and detecting the received microwave to convert the same into a low frequency signal; a probe comprising a microwave sensor for radiating the microwave into a combustion chamber and receiving a reflected wave and a light sensor for electrically detecting the light emitted upon combustion and a processing unit comprising a peak detector unit for detecting peaks of the microwave signal supplied from the microwave unit, a luminous signal processor unit for detecting a peak value of the first peak of a luminous signal supplied by the light sensor of the probe in each cycle and also detecting the time when the luminous signal reaches an intensity having a predetermined proportion to the first peak value thereof, and an operating unit for operating a time difference between a midpoint between peaks of the microwave signal and the time when the luminous signal reaches an intensity having a predetermined proportion to the first peak value thereof.

The apparatus for detecting combustion timing according to the present invention having the foregoing construction is adapted to detect the first peak value of the luminous signal in each cycle and to operate a time difference between the time when the luminous signal reaches an intensity having a predetemined proportion to the first peak value thereof and a midpoint between peaks of the microwave, to thereby detect the timing for starting combustion with respect to the top dead center.

The luminous signals detected and supplied by the light sensor of the probe have a complicated wave form containing a plurality of peaks when they are observed finely as shown in FIG. 1. In view of the above, the present inventors have made various experiments and analytical studies in order to determine as to which of the plurality of peak values should be taken as the peak value for the luminous signals. As the result, we have reached a conclusion that such peak value should be represented by the first peak of the luminous signal corresponding to the first combustion peak resulted upon ignition and firing of air-fuel mixture in the combustion chamber.

Specifically, since the combustion in the combustion chamber is complicated, if the maximum peak is selected as the peak value for the luminous signal among the plurality of peaks thereof, the rise time and the peak value of the maximum peak vary depending on the combustion state. Therefore, it results in disadvantages, in the subsequent detection of the timing when a predetermined proportion of intensity of the peak value thus obtained is reached, in that the detection is affected by the variation of the rise times of the plurality of peaks present till the maximum peak appears or in that the first peak with a constant rising timing is lost. In view of the above, by determining the first peak of the luminous signal with the constant rise time as a representative peak value for the luminous signal, it provides advantages in that the detection for a plurality of peaks generated subsequently is no more necessary, with no effect therefrom, as well as in that the timing less varies in reaching a predetermined proportion of intensity since the wave form of the luminous signal till the generation of the first peak is relatively smooth and changes linearly.

Accordingly, the apparatus for detecting combustion timing according to the present invention has a merit that it can accurately detect the timing for starting combustion even when the luminous intensity varies due to the combustion state in the internal combustion engine.

The present invention can provide a further merit that it can accurately detect the timing for starting combustion with respect to the top dead center with no effect from the variation in the combustion state of the internal combustion engine since the timing for starting combustion is detected by the time when the luminous signal reaches an intensity having a predetermined proportion to the peak value for the first peak, that is, by the relative intensity of the luminous signal. Particularly, since the peak value for the intensity of the luminous signal varies nearly 50% under no load or low speed condition, it can provide a merit of improving the accuracy for the rise time as compared with the case of determining the rise time of the luminous signal by the point it exceeds a certain intensity level.

Furthermore, the probe according to the present invention has practical merits that it is of a simplified structure and easy to manipulate.

The above and other objects, features and advantages of the present invention will become more apparent from the following descrpition when take in conjunction with the accompaying drawings in which a preferred embodiment of the invention is shown by way of illustrative example.

BRIEF DESCRIPTION OF THE DRAWINGS

FIGS. 2 through 4 are charts showing an apparatus according to a preferred embodiment of the invention, in which FIG. 2 is a block diagram showing the apparatus of the preferred embodiment, FIG. 3 is a time chart showing output signals from respective components in the processing unit of the present embodiment and FIG. 4 is a flow chart showing the processing steps in the central processing unit employed in the present embodiment.

DETAILED DESCRIPTION

Figure 1:
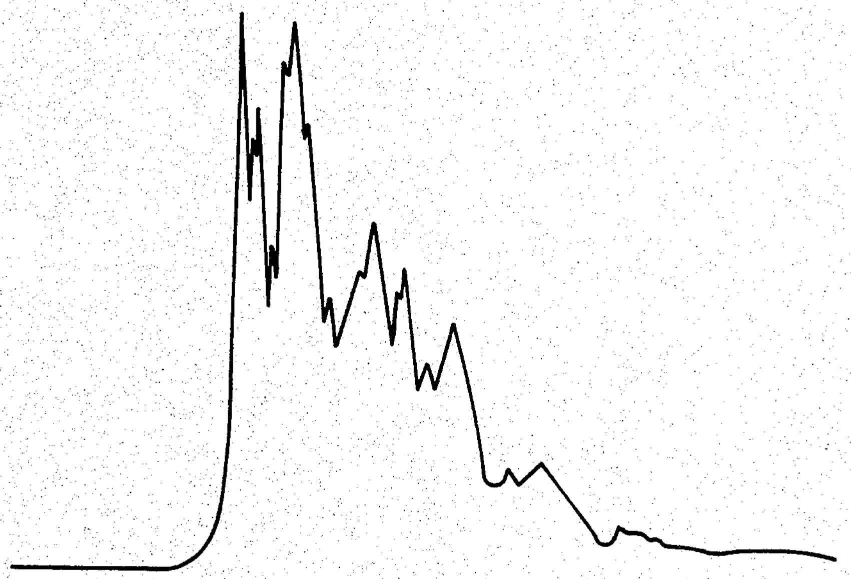
FIG. 1 is a chart showing a luminous signal for illustrating the principle of the present invention.

The apparatus for detecting combustion timing according to the present invention can be embodied as follows.

The apparatus for detecting combustion timing according to a first aspect of the present invention comprises a processing unit including a peak detector unit for detecting peaks of the microwave signal supplied from the microwave unit, a luminous signal processor unit for detecting the first peak value of the luminous signal supplied by the light sensor of the probe in each cycle and effecting A/D conversion of the luminous signal within a range of from a predetermined rise point of the luminous signal to the first peak thereof, a counter unit comprising a counter for detecting the peak-to-peak time of the microwave signal and detecting the time from the peak of the microwave signal to the predetermined rise point of the luminous signal and a counter for counting the time between the prior and the subsequent luminous signals as a number of reference clocks, and a central processing unit for operating the midpoint between peaks of the microwave, operating the time when the luminous signal reaches an intensity having a predetermined proportion to the first peak value thereof based on the signal from the counter unit and on the signal supplied from the luminous signal processor unit and directly transferred and stored into RAM, and operating a time difference between the midpoint between peaks of the microwave and the time when the luminous signal reaches the intensity having the predetermined proportion to the first peak value thereof.

According to the first aspect having the foregoing construction, the signal supplied from each of the sensors is previously processed in discrete circuits into such forms as to be processed easily in the subsequent operating unit and the time difference determined on the real time is operated in digital circuit such as the counters in the counter unit capable of having a high time divisional function, high speed operation and high reliability. Accordingly, the operation unit has only to operate the rise time of the luminous signal, combustion starting timing or the like advantageously in its inherent function based on these signals and previously transferred signals, thereby overcoming the drawbacks involved in the conventional apparatus having no such operation unit, that is, with poor accuracy and the complicated circuit structure.

Since the conventional method requires the simultaneous processing of the rapid microwave signal and the luminous signal outputted immediately before and after the microwave signal, the latter signal has to be delayed. When an analog delay circuit is used, there is a difficulty in satisfying the requirement of more than 10 msec of delay time and less than 1.0% of linearity which, if intended, will result in a very much complicated and expensive structure. The use of a digital delay circuit including an A/D converter, memory means, a D/A converter or the like necessitates a complicated circuit structure, requires high cost and provides only insufficient accuracy.

The apparatus for detecting combustion timing according to a second aspect of the present invention detects the level of the microwave signal from the microwave sensor and checks whether the transmitting and receiving operation of the microwave sensor of the probe is normal or not.

The performance of the microwave sensor tends to be degraded since it is disposed withing the combustion chamber in the internal combustion engine and put under severe circumstantial conditions such as high temperature, vibrations at high acceleration, carbon contaminations or the like. The second aspect of the invention monitors the performance of the microwave sensor to automatically maintain the accuracy and to inform the operator of the occurrence of the degradation so that a countermeasure can rapidly be taken.

The apparatus for detecting combustion timing according to a third aspect of the invention detects the signal level of the luminous signal supplied form the light sensor and checks whether it has a level capable of processing or not.

The light sensor is put under the severe circumstantial conditions and liable to be degraded in the same manner as the microwave sensor. The third aspect of this invention always monitors the performance of the light sensor to automatically maintain the accuracy and to inform the operator of the occurrence of the degradation so that a countermeasure can rapidly be taken.

The apparatus for detecting combustion timing according to a fourth aspect of the present invention detects the temperature for the microwave oscillator of the microwave unit to thereby prevent the rise of the temperature in excess of the operative temperature, and compensates the fluctuation in the output frequency of the microwave oscillator depending on the temperature change.

The frequency stability of about $10^{-5}$ is necessary for the microwave oscillator used in the microwave unit in order to improve the reproducibility of the microwave signal. The fourth aspect of the invention prevents failures due to the abnormal increase in the temperature, and controls the frequency of the microwave oscillator so as to offset the frequency fluctuation due to the change in temperature to thereby compensate the fluctuation in the output frequency.

The apparatus for detecting the combustion timing according to a fifth embodiment of the present invention comprises the processing unit in the first aspect, in which the peak detector unit comprises an AC amplifier for cutting the DC component in the microwave signal supplied from the microwave unit, a peak follower circuit for following the peak of the microwave signal cut with the DC component, a divider circuit for dividing the amplitude of the peak follower output into 70–80%, a clamp circuit outputting only the signal in excess of the divided peak follower output as a reference voltage of the microwave signal, a differentiation circuit for differentiating the clamped output and a comparator for detecting the point of the differentiated signal crossing the zero voltage as a peak value.

Since the clamp level (reference voltage) in the clamp circuit is determined by dividing the peak follower output and the clamp level can be adjusted automatically depending on the signal level of the microwave signal in the fifth aspect of the invention, the combustion timing can be detected accurately even if the signal level of the microwave signal varies.

Furthermore, it has a merit of cutting several small peaks present between relatively large peaks of the microwave and preventing the misoperation in the subsequent signal processing. Furthermore, since the clamp output is differentiated by the differentiation circuit and the point at which the differentiated signal crosses the zero voltage is detected as the peak value, it has a merit of saving the resetting operation for the peak holding capacitor after the detection of the peak required in the usual peak detection.

The apparatus for detecting combustion timing according to a sixth aspect the present invention comprises the processing unit as in the foregoing first aspect, in which the luminous signal processor unit comprises a peak follower cirucuit for following the peak of the luminous signal from the light sensor, a divisional circuit for arithmetically dividing the luminous signal by the peak follower signal, and an A/D converter for A/D conversion of the divided signal, so that a divided output signal having the same peak value may be issued even if the peak of the luminous signal from the light sensor is varied.

While the peak value and the level of the luminous signal supplied from the light sensor always vary, the sixth aspect of the invention has a merit of dividing the luminous signal by the peak follower output of the luminous signal to automatically adjust the gain and thereby detecting the combustion timing accurately even when the level of the luminous signal is varied.

The apparatus according to a preferred embodiment of the present invention will now be described with respect to FIG. 2 through FIG. 4.

The apparatus for detecting combustion timing in this embodiment is applied to the detection of the fuel injection timing in a diesel engine having a pre-chamber.

Specifically, in a diesel engine having a main chamber and a pre-chamer, a microwave is irradiated from the pre-chamber into the main chamber and a top dead center is detected from the time of the midpoint between the peaks of the microwave by utilizing the resonance in the cylindrical main chamber, and the fuel injection by detecting a time difference between the midpoint of the peaks of the microwave and the time when a luminous signal from the pre-chamber reaches 10% of the first peak value thereof.

The inventors of the present invention have acquired a knowledge based on experiments that although in a strict sense the fuel injection timing differs from the time when the luminous signal upon combustion reaches 10% value since fuel in the combustion chamber is ignited and burned after it has been injected by a fuel injection device, the correspondence between them is constant under all operating conditions and can be used sufficiently as a substitute signal for a fuel injection timing signal. In this embodiment, the present invention is applied based on this knowledge.

Figure 2:
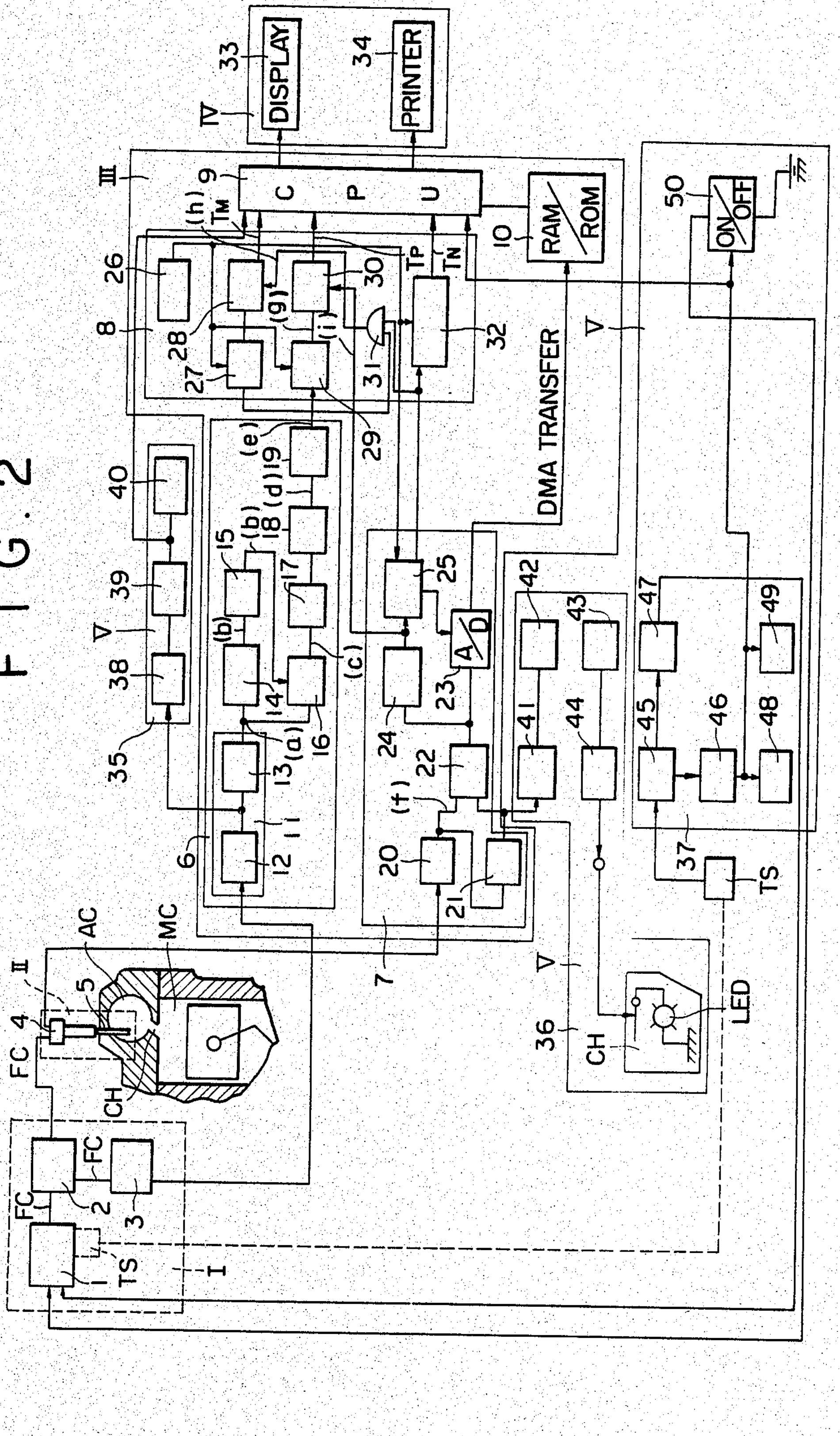

The apparatus for detecting combustion timing in this embodiment comprises, as shown in FIG. 2: a microwave unit I for generating a microwave of a predetermined frequency and converting a received microwave into a low frequency signal; a probe II for radiating and receiving the microwave to and from a pre-chamber of a combustion chamber and for detecting the light emission upon ignition and combustion in the pre-chamber; a processing unit III for detecting a top dead center of the engine from the time of the mid point between peaks of the microwave before and after the top dead center on the resonant wave form of the microwave and also detecting the time of fuel injection from the time when a luminous signal reaches an intensity having a predetermined proportion (about 10%) to a peak value thereof as determined in each cycle of the engine, and for detecting a time difference between the time of the top dead center and the fuel injection time to thereby detect the fuel injection timing; a display unit IV for indicating the detected fuel injection timing; and a check and compensation circuit V.

The microwave unit 1 comprises a microwave oscillator 1 for generating a microwave, a transmission and reception separator 2 for separating transmitted and received microwaves and a detector 3 for detecting and converting the received microwave into a low frequency signal.

The microwave oscillator is set to an oscillation frequency of 18 GHz. The apparatus of this embodiment utilizes the fact that the metal wall surface of the closed combustion chamber such as an engine cylinder constitutes a cavity resonator where the electomagnetic field causes a resonating phenomenon. Since the resonance occurs in a plurality of piston positions corresponding to the cylindrical resonance modes in the combustion chamber, a microwave radiated into the combustion chamber during rotation of the engine is resonated in particular piston positions and the microwave is absorbed. As shown in FIG. 3(*a*), the absorbed wave form appears symmetrical before and after the top dead center as it corresponds to the piston resonant positions. The top dead center can be determined by detecting the mid point between the peaks which are closest to the top dead center among the peaks.

The oscillation frequency is set to 18 GHz in this embodiment. As the result, the resonance closest to the top dead center occurs at a position about 8 mm in the piston stroke from the top dead center, which corresponds to the crank angle of about 30 degrees before or after the top dead center in the engine to which the present embodiment is applied.

The probe II comprises a tubular cylinder 4 having a flange and a tubular cylinder 5 of a smaller diameter fitted into the tubular cylinder 4 and projected by a predetermined length into a pre-chamber AC of the internal combustion engine. Within the tubular cylinder 5 of a smaller diameter, there are disposed tow metal tubes of different diameters, i.e., a coaxial air-line inner conductor and a coaxial air-line outer conductor, between which are introduced a microwave and an optical information for the light emitting phenomenon upon combustion in the pre-chamber. An annular transparent window is disposed at the projected top end of the metal tube for preventing the intrusion of fuels and combustion gases into the metal tubes. A photodiode is disposed as a light sensor in the tubular cylinder 4 at the position opposing to the other end of the metal tube. Within the tubular cylinder 4 is formed a chamber serving as a coaxial wave guide converter, into which the other end of the metal tube is projected and also a microwave connector connected by way of a microwave coaxial cable FC to a circulator 2 of the microwave unit I is protruded.

The processing unit III comprises, as shown in FIG. 2, a microwave peak detector unit 6, a luminous signal processor unit 7, a counter unit 8, a central processing unit 9 and a RAM/ROM memory 10.

The microwave peak detector unit 6 comprises an amplifying unit 11 having an amplifier 12 and an AC amplifier 13, a peak follower circuit 14, a voltage divider circuit 15, a clamp circuit 16, an amplifier 17, a differentiation circuit 18 and a comparator 19.

The amplifier 12 in the amplifying unit 11 is connected to the detector 3 of the microwave unit I, for amplifying the low frequency signal detected from the microwave by the detector 3 without changing the polarity. The AC amplifier 13 is connected to the amplifier 12 for cutting the DC component (low frequency component) of the amplified microwave signal and outputting the signal as shown in FIG. 3(*a*).

Figure 3:
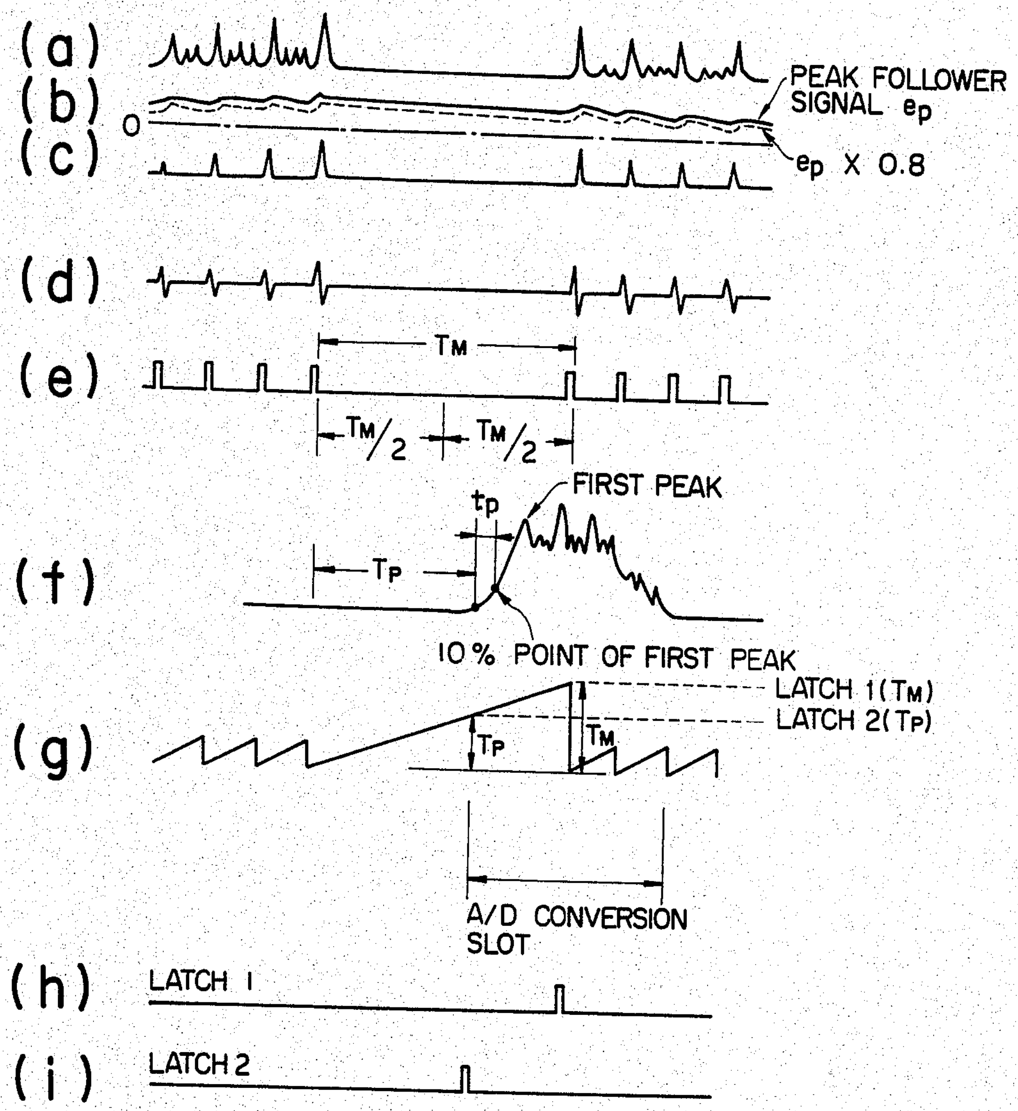

The peak follower circuit 14 is connected to the AC amplifier 13 in the amplifying unit 11 for outputting a signal following the peaks of the microwave signal outputted from the AC amplifier 13 (peak follower signal ep shown in FIG. 3(*b*)). The voltage divider circuit 15 is connected to the peak follower circuit 14 for outputting the divided peak follower signal corresponding to 70–80% of the peak follower signal (shown as ep×0.8 in FIG. 3(*b*)).

The clamp circuit 16 is connected to the AC amplifier 13 in the amplifying section 11 and to the voltage divider circuit 15 for outputting only the signal in excess of the peak follower output divided to 80% of the microwave signal cut with the DC component as the clamp level (shown as ep×0.8 in FIG. 3(*b*)) as a clamp output shown in FIG. 3(*c*).

Namely, small peaks present between relatively large peaks of the microwave are cut off to prevent the misoperation in the subsequent signal processing. The amplifier 17 is connected to the clamp circuit for amplifying the clamp output as much as 10 times. The differentiation circuit 18 is connected to the amplifier 17 for differentiating the amplified clamp output and outputting the same as a differentiated wave form signal shown in FIG. 3(*d*).

The comparator 19 is connected to the differentiation circuit 18 to constitute a zero-crossing detection circuit with a hysteresis characteristic for outputting the signal as shown in FIG. 3(*e*), in which pulses rise at each of the points when the positive component of the differentiated signal issued from the differentiation circuit 18 arrives at a predetermined amplitude and the pulses fall at each of the points where the signal crosses the zero voltage where it turns from positive to negative level. Accordingly, the falling point of the pulse signal from the comparator 19 corresponds to the peak point of the microwave signal, and accurate peak point can be detected based on this falling point.

The luminous signal processor unit 7 comprises, as shown in FIG. 2, an amplifier 20, a peak hold circuit 21, an arithmetic divider 22, an A/D converter 23, a comparator 24 and a control circuit 25.

The amplifier 20 is connected to the photodiode of the light sensor disposed in the probe II for amplifying the luminous signal from the light sensor and outputting a signal shown in FIG. 3(*f*). The peak follower circuit 21 is connected to the amplifier 20 for following the peak of the amplified luminous signal and amplifying the same to a level corresponding to the input level to the subsequent arithmetic divider. The arithmetic divider 22 is connected to the amplifier 20 and the peak follower circuit 21 for dividing the amplified luminous signal outputted from the amplifier 20 with the peak follower output from the peak follower circuit 21 to thereby output a signal of a constant level irrespective of the level variation in the luminous signal from the optical sensor due to uneven combustion in the combustion chamber.

The comparator 24 is connected to the arithmetic divider 22 for outputting a signal in synchronism with the luminous signal (the level of which is rendered constant by the divider 22) when it rises from the zero level. The control circuit 25 is connected to the comparator 24 and to a reference clock generator to be described later for outputting a rectangular wave form signal which rises upon generation of the signal from the comparator 24 and falls after the elapse of a time with a little allowance to the time expected for the generation of the first peak of the luminous signal.

The A/D converter 23 is connected to the arithmetic divider 22 and to the control circuit 25 for converting the luminous signal from the divider 22 into a digital signal while the signal from the control circuit 25 is present and transferring the same in DMA mode (direct memory access) to RAM connected to a central processing unit described hereinafter.

The counter unit 8 comprises a reference clock generator 26, a first counter 27, a first latch circuit 28, a second counter 29, a second latch circuit 30, an AND circuit 31 and a $T_N$ counter 32.

The reference clock generator 26 outputs reference clock signal. The first counter 27 is composed of a digital counter connected to the comparator 19 of the microwave peak detector unit 6 and to the reference clock generator 26, for counting the clock signals from the reference clock generator 26 inputted from the time the peak before the top dead center of the microwave signal is inputted to the time the peak after the top dead center is inputted as shown in the FIG. 3(*g*). The first latch circuit 28 is connected to the first counter 27 for temporarily storing the count value ($T_M$) of the first counter 27. The first latch circuit 28 outputs the stored signal to the central processing unit to be described hereinafter only when the luminous signal is inputted between the peaks before and after the top dead center.

The second counter 29 is composed of a digital counter connected to the comparator 19 in the microwave peak detector unit 6 and to the reference clock generator 26 for counting the clock signals from the reference clock generator 26 inputted between the succeeding inputs for the peaks of the microwave signals. The second latch circuit 30 is connected to the second counter 29 and the comparator 24 in the luminous signal processor unit 7 for temporarily storing the count value of the second ounter 29 and outputting the count value ($T_P$) to the central processing unit corresponding to the period of time from the generation of the peak prior to the top dead center to the rise time of the luminous signal based on the latch signal (FIG. 3(*i*)) from the comparator 24.

The AND circuit 31 is connected to the comparator 19 in the microwave peak detector unit 6 and the control circuit 25 in the luminous signal processor unit 7 for outputting a latch signal (shown in FIG. 3(*h*)) to the first latch circuit 28 only when both of the comparator 19 and the control circuit 25 output signals and controlling the first latch circuit 28 so that it outputs the stored signal ($T_M$) to the operation unit only when the luminous signal is inputted between both of the peaks before and after the top dead center.

The $T_N$ counter 23 is composed of a digital counter connected to the reference clock generator 26 and the control circuit 25 in the luminous signal processor unit 7 for always counting the reference clocks generated from the reference clock generator 26, detecting the number of rotation in the internal combustion engine from the count value corresponding to the period of time between the signals outputted from the control circuit 25 on every 2 rotations of the internal combustion engine and converting the signal determined in terms of the time into the crank angle of the internal combustion engine.

Figure 4:
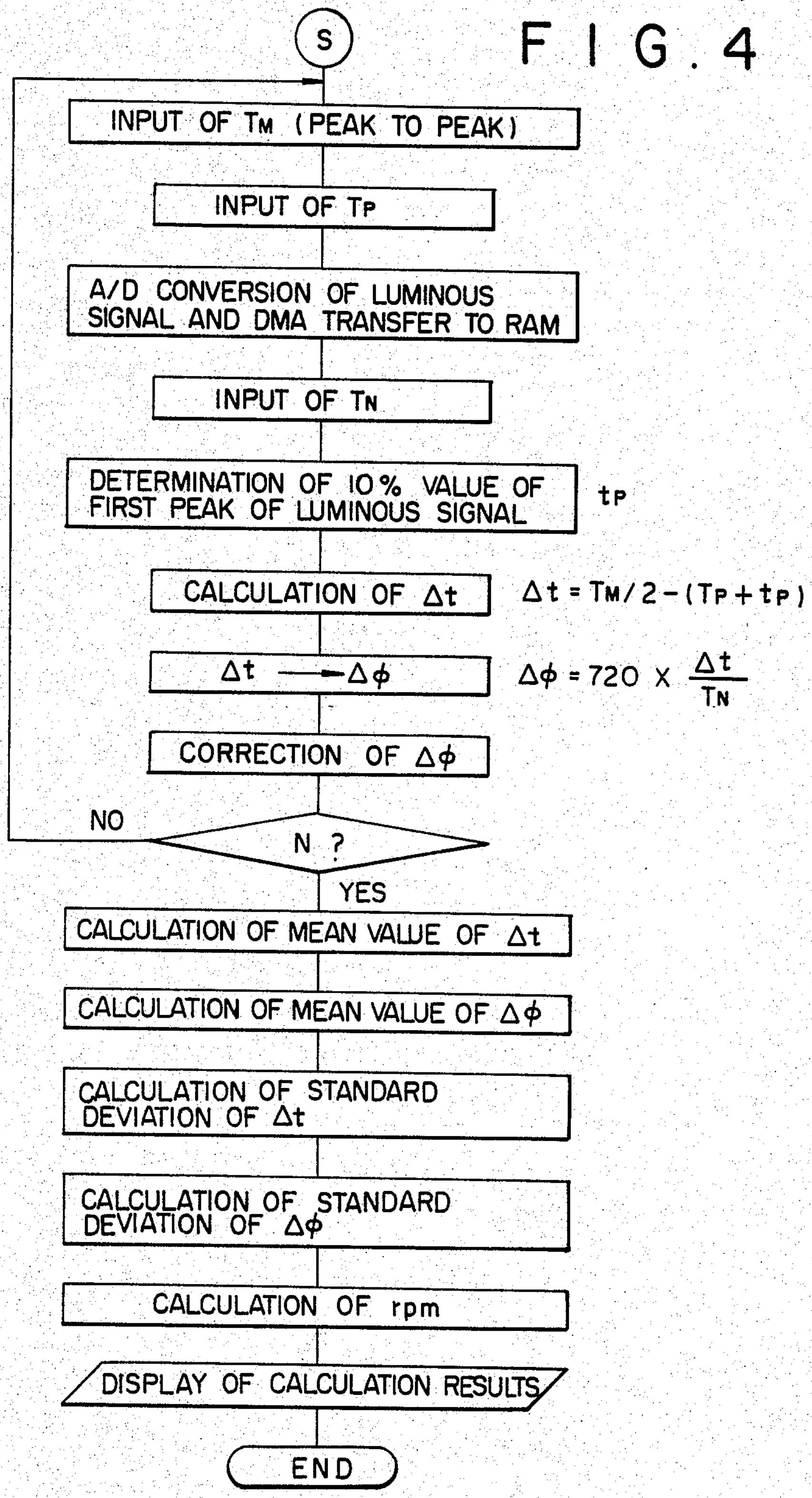

The central processing unit 9 is connected by way of I/O interface to the first latch circuit 28, the second latch circuit 30 and the $T_N$ counter 32 in the counter unit 8 and to RAM/ROM storing the luminous signal converted into the digital signal, for processing the data based on these information by way of the processing steps shown in FIG. 4. The program for conducting the operation in the processing steps shown in the flow chart of FIG. 4 is previously stored in ROM.

Digital signals in the slot including the rise time and the first peak of the luminous signal DMA-transferred from the A/D converter 23 in the luminous signal processor unit 7 are stored in the respective addresses in RAM at the same time interval as the reference clock pulses.

Main steps to be processed by the central processing unit 9 are set forth below.

(1) Computation of time difference $\Delta t$ between the mid points of peaks of the microwave signal and 10% of peak value for the first peak of the luminous signal.

The time $t_p$ between the rise point of the luminous signal and the time for the 10% peak value of the first peak is determined by reading the data stored in RAM 10, operating the address and the peak value for the first peak, determining the value corresponding to the 10% value and the address for the data having this value, and multiplying the address and the pulse interval of the reference clocks. The rise point of the luminous signal is set to the zero address in this embodiment.

Then, the time difference $\Delta t$ between the mid point of the microwave signal and the 10% peak value for the first peak of the luminous signal is operated from the peak interval $T_M$ of the microwave inputted from the first and second counters 28 and 30, data for the time $T_p$ from the peak prior to the top dead center to the rise point of the luminous signal and the above-determined time $t_p$, based on the following equation :

$$\Delta t = T_M/2 - (T_p + t_p)$$

(2) Computation of an arithmetic mean and a standard deviation of the time difference $\Delta t$.

(3) Computation of angular difference $\Delta\phi$ in the crank angle based on the time difference $\Delta t$.

(4) Computation of an arithmetic mean and a standard deviation of the angular difference $\Delta\phi$.

The display unit IV displays the fuel injection timing and the injection angle based on the time difference signal and the angle difference signal outputted from the processing unit III on analog meters or digital display devices 33 and prints out the same by a printer 34 as well.

The check and compensation circuit V comprises a microwave signal checking circuit 35, a luminous signal checking circuit 36 and a temperature compensating circuit 37.

The microwave signal checking circuit 35 comprises a low path filter 38 connected to the amplifier 12 in the microwave peak detector 6, a comparator 39 connected to the low path filter and a display means 40 composed of LED devices connected to the comparator 39. The microwave signal checking circuit 35 detects only the low frequency component (DC component) of the microwave signal through the low path filter 38, comparing the same with a predetermined level for insuring normal operation and, if it exceeds the predetermined level, that is, abnormality is present in the microwave signal, displays this on the display means 40 to inform abnormality. Normal operation is confirmed if there is no display. It has a constant negative value if the microwave signal is normal but takes or approaches the zero level if the signal is abnormal. The circuit 35 is operated for measurement or checking of the probe operation.

The luminous signal checking circuit 36 comprises two sections, that is, a first section composed of a comparator 41 connected to the peak hold circuit 21 in the luminous signal processor unit 7 and a display means 42 composed of LED devices connected to the comparator 41 and a second section composed of a generator 43, a drive circuit 44 connected to the generator, and a checker CH connected to the drive circuit 44 and incorporating LED device generating a reference light amount. The first section judges whether the signal level for the luminous signal outputted from the peak hold circuit 21 has a level capable of processing or not and, when the signal level is insufficient, displays this on the LED device. In the second section, the generator 43 generates rectangular pulses at 1 KHz for checking the light sensor in the probe II and the LED device disposed at the bottom of the bottomed tubular cylinder with a hole for inserting the probe 2 is driven by the drive circuit 44 only upon insertion of the probe 2, at which the LED device generates a reference light. The second section checks whether the output from the light sensor prior to the measurement has a predetermined signal level in the first section.

The temperature compensating circuit 37 comprises a thermal sensor TS disposed in the microwave oscillator 1 in the microwave unit I, a temperature detection circuit 45 connected to the thermal sensor TS, a comparator 46 connected to the temperature detection circuit 45 for comparing the temperature with a predetermined one, a compensation circuit 47 for controlling the tuning voltage depending on the change in temperature of the microwave oscillator 1, and a display means 48, an alarm 49 and a switch 50 composed of SSR each connected to the comparator 46. Since the frequency of the microwave oscillator 1 decreases as the temperature rises, the compensation circuit 47 is adapted to supply the microwave oscillator with a tuning voltage whose frequency is increased with the rise in temperature. Furthermore, in order to keep the atmospheric temperature for the microwave oscillator 1 to less than 50° C., the temperature is detected by the thermal sensor TS. The comparator judges whether the predetermined temperature is exceeded or not and, when exceeded, displays this on the display means 48. At the same time, the alarm 49 is rung and the power source for the microwave oscillator 1 is turned OFF by the switch 50.

The operation and advantageous effect of the apparatus thus constructed according to this embodiment will be described.

A microwave delivered from the microwave oscillator 1 in the microwave unit I is transmitted by the circulator 2 over the coaxial microwave cable FC. Since the coaxial microwave cable FC is connected to the microwave connector in the probe II, the microwave is converted in the coaxial waveguide converter into a waveguide mode (TE mode) and passes through the waveguide. Then, it is converted in the coaxial waveguide converter into a coaxial mode (TEM mode), guided along the coaxial air line into the pre-chamber AC, and introduced through the passage CH into the main chamber MC. When the piston in the main chamber MC is not in a resonance position, the microwave is reflected and transmitted back over the same route into the circulator 2 through the coaxial microwave cable FC. The reflected microwave is separated from the transmitted microwave in the circulator 2, and enters the detector 3 in which the microwave is detected and converted into a low frequency electric signal, which is then fed to the processing unit III. The photodiode generates a luminous signal upon ignition and combustion in the pre-chamber AC.

In the processing unit III, the low frequency microwave signal issued by the detector 3 in the microwave unit I is processed by the peak detector 6, the luminous signal generated by the probe II is processed by the luminous signal processor unit 7 and, thereafter, the operation based on the program is conducted by the central processing unit 9. Thus, the difference between the mid point of peaks of the microwave signal and 10% of the peak value of the first peak in the luminous signal, that is, a signal indicative of a time difference between the top dead center and the fuel injection timing, and an angle difference signal indicative of the time difference in terms of the crank angle.

The display unit IV is responsive to the time difference signal and the angle difference signal issued by the processing unit III and displays a fuel injection timing and an injection angle on the analog meters or the digital display devices of the printer 34.

The apparatus with the abovementioned construction and operation is advantageous in that fuel injection timing with respect to the top dead center can accurately be detected through a simple system even when the engine operating condition varies since it is detected by the relative intensity of the luminous signal.

The present embodiment is further advantageous in that it is capable of accurately detecting fuel injection timing with respect to the top dead center as a crank angle dependent on the engine rotating speed based on a stored conversion coefficient, without employing a sensor such as an encoder, thus making subsequent control reliable.

The present embodiment is also advantageous in that the accuracy can be increased by finding an arithmetic mean of signals and monitoring a standard deviation at all times through statistical processing, thereby detecting malfunctions of the engine and the probe.

The present embodiment is further advantageous in that systematization is achieved by a hybrid arrangement including a microcomputer and other hardwares which advantageously effect their inherent functions to facilitate arithmetic operations even for a high-speed phenomenon such as a microwave. Specifically, since the output signals from each of the sensors are previously processed in the discrete circuits at the prior stage into such forms as are capable of being easily processed in the central processing unit at the subsequent stage, and the time difference determined on the real time is operated in highly reliable digital circuits such as the counters in the counter unit 8 in this embodiment, the central processing unit 9 advantageously performs operation in an effective manner inherent thereto based on these signals and the previously transferred signals, whereby the functions of the apparatus can effectively be utilized as a whole, and the drawbacks involved in the conventional apparatus such as poor accuracy and the complicated structure of the circuit can be overcome.

The present embodiment is further advantageous in that since the signal is clamped with the divided output from peak-follower by the clamp circuit in the microwave peak detector unit, the clamp level can be detected automatically thereby enabling accurate detection even when the signal level varies and, since small peaks present between relatively large peaks of the microwave are cut, misoperation in the subsequent signal processing can be prevented.

The present embodiment is further advantageous in that the operation conditions for the microwave sensor, the light sensor and the microwave oscillator are checked by the check and compensation circuit to thereby improve the reliability in measurement and issue an alarm upon occurrence of abnormality.

The present embodiment is additionally advantageous in that it comprises a simple system whcih can be mounted and detached with ease, is highly reliable in operation, and hence can sufficiently be put to use on a production line.

Although a certain preferred embodiment has been described in detail, it should be understood that the present invention is not limited to the illustrated embodiment, but changes, deletions and additions of components may be made therein as desired without departing from the scope of the appended claims.

Although the microwave sensor and the light sensor are integrally disposed within the probe for facilitating the mounting and detachment in the foregoing embodiment, they may be constructed separately. Further, although the LED devices are disposed in the checker CH of the luminous signal checking circuit 36, a lamp driven by a DC power source may be employed and this provides a merit of ensuring a sufficient intensity of light.

What is claimed is:

1. An apparatus for detecting combustion timing in an internal combustion engine comprising a microwave unit comprising a microwave oscillator for generating a microwave having a predetermined frequency, a transmission and reception separator connected to said microwave oscillator, for separating transmitted and received microwaves from each other, and a detector connected to said transmission and reception separator, for detecting the received microwave to convert the same into a low frequency signal, a probe means comprising a microwave sensor connected to said separator, for radiating the microwave from said separator into a combustion chamber of said internal combustion engine and receiving a reflected wave, and a light sensor for electrically detecting light emitted upon combustion in the combustion chamber, and a processing unit comprising a peak detector unit connected to said detector of said microwave unit, for detecting peaks of a microwave signal supplied by said detector, a luminous signal processing unit, connected to said light sensor of said probe means, for detecting a peak value of the first peak of a luminous signal supplied by said light sensor in each cycle and also detecting the time when the luminous signal reaches an intensity having a predetermined proportion to the first peak value thereof, and an operating unit, connected to said peak detector unit and luminous signal processing unit, for operating a time difference between a midpoint between a pair of peaks of the microwave signal and the time when the luminous signal reaches an intensity having a predetermined proportion to the first peak value thereof based on peak and luminous signals, thereby detecting the timing for starting combustion with respect to a top dead center of said internal combustion engine.

2. An apparatus for detecting combustion timing according to claim 1, wherein said luminous signal processing unit effect A/D conversion of said luminous signal within a range of from a predetermined rise point to said first peak thereof, and said operating unit comprises a counter unit comprising a first counter for detecting the peak-to-peak time of the microwave signal and detecting the time from the peak of the microwave signal to the predetermined rise point of the luminous signal and a second counter for counting the time between the prior and subsequent luminous signals as a number of reference clocks, and a central processing unit, connected to said counter unit, for operating the midpoint between peaks of the microwave, operating the time when the luminous signal reaches an intensity having a predetermined proportion to the first peak value thereof based on the signal from said counter unit and on the signal supplied from the luminous signal processing unit and directly transferred and stored into RAM, and operat1ng a time difference between the midpoint between peaks of the microwave and the time when the luminous signal reaches the intensity having the predetermined proportion to the first peak value thereof.

3. An apparatus for detecting combustion timing according to claim 2, wherein said peak detector unit of said processing unit comprises: an AC amplifier, connected to said microwave unit, for cutting the DC component in the microwave signal supplied from said microwave unit; a peak follower circuit, connected to said AC amplifier, for following the peak of the microwave signal cut with DC component; a divider circuit, connected to said peak follower circuit, for dividing the amplitude of the follower output into 70-80%; a clamp circuit, connected to said AC amplifier and divider circuit, for outputting only the signal in excess of the divided peak follower output as a reference voltage of the microwave signal; a differentiation circuit, connected to said clamp circuit, for differentiating the clamped output; and a comparator, connected to said differentiation circuit, for detecting the point of the differentiated signal crossing the zero voltage as a peak value.

4. An apparatus for detecting combustion timing according to claim 2, wherein said luminous signal processing unit of said processing unit comprises a peak follower circuit, connected to said light sensor, for following the peak of the luminous signal from said light sensor, a dividing circuit, connected to said light sensor and peak follower circuit, for arithmetically dividing the luminous signal by the peak follower signal, and an A/D converter, connected to said dividing circuit for A/D conversion of the divided signal, whereby the divided output signal having the same peak value may be issued even if the peak of the luminous signal from said light sensor is varied.

5. An apparatus for detecting combustion timing according to claim 2, wherein said luminous signal processing circuit of said processing unit detects the time when the luminous signal reaches a 10% intensity to the first peak thereof.

6. An apparatus for detecting combustion timing according to claim 8, wherein said microwave oscillator of said microwave unit generates a microwave having 18 GHz, said microwave sensor of said probe means radiates the microwave from said microwave unit from a pre-chamber to a main chamber of said engine through a connecting hole thereof, said light sensor of said probe means comprises a photodiode, provided to oppose hole means for supplying light emitted from a pre-chamber of said engine, for converting the detected light to an electric luminous signal, said peak detector unit of said processing unit detects a pair of peaks which are nearest to the top dead center of said engine, said operating unit of said processing unit further comprises an averaging and statistically processing means for arithmetically averaging the time difference signal, statistically processing the averaged time difference signal to obtain a standard deviation, and confirming the standard deviation to be fallen within a predetermined range, said processing unit further comprises a crank angle converter, connected to said operating unit, for converting the time difference signal operated by said operating unit to a crank angle difference signal based on a predetermined conversion coefficient which is dependent on a speed of said internal combustion engine, and further comprising display means, connected to said processing unit, for displaying the timing for starting combustion with respect to the top dead center thereof based on an output signal of said processing unit.

7. An apparatus for detecting combustion timing according to claim 6, wherein said peak detector unit of said processing unit comprises: an AC amplifier, connected to said microwave unit, for cutting the DC component in the microwave signal supplied from said microwave unit; a peak follower circuit, connected to said AC amplifier, for following the peak of the microwave signal cut with DC component; a divider circuit, connected to said peak follower circuit, for dividing the amplitude of the follower output into 70–80%; a clamp circuit, connected to said AC amplifier and divider circuit, for outputting only the signal in excess of the divided peak follower output as a reference voltage of the microwave signal; a differentiation circuit, connected to said clamp circuit, for differentiating the clamped output; and a comparator, connected to said differentiation circuit, for detecting the point of the differentiated signal crossing the zero voltage as a peak value, and said luminous signal processing unit of said processing unit comprises a peak follower circuit, connected to said light sensor, for following the peak of the luminous signal from said light sensor, a dividing circuit, connected to said light sensor and peak follower circuit, for arithmetically dividing the luminous signal by the peak follower signal, and an A/D converter, connected to said dividing circuit for A/D conversion of the divided signal, whereby the divided output signal having the same peak value may be issued even if the peak of the luminous signal from said light sensor is varied.

8. An apparatus for detecting combustion timing according to claim 7, wherein said counter circuit comprises a reference clock generator for generating reference clock signals, a first counter comprising a digital counter, connected to said reference clock generator and said comparator of said peak detector unit, for counting the clock signals from the reference clock generator inputted from the time the peak before the top dead center of the microwave signal is inputted to the time the peak after the top dead center is inputted, a first latch circuit, connected to said first counter, for temporarily storing the count value of said first counter, and outputting the stored signal to said central processing unit only when the luminous signal is inputted between the peaks before and after the top dead center, a second counter comprising a digital counter, connected to said comparator in the peak detector unit and to said reference clock generator, for counting the clock signal from said reference clock generator inputted between the succeeding inputs for the peaks of the microwave signals, a second latch circuit, connected to said second counter and a comparator connected to said divider circuit in said luminous signal processing unit, for temporarily storing the count value of said second counter and outputting the count value to said central processing unit corresponding to the period of time from the generation of the peak prior to the top dead center to the rise time of the luminous signal based on the latch signal from said comparator of said luminous signal processing unit, an AND circuit, connected to said comparator of said peak detector unit and a control circuit connected to said comparator in said luminous signal processing unit, for outputting a latch signal to said first latch circuit only when both of said comparator of said peak detector unit and said control circuit in said luminous signal processing unit output signals and controlling the first latch circuit so that it outputs the stored signal to said operation unit only when the luminous signal is inputted between both of the peaks before and after the top dead center, and a $T_N$ counter comprising a digital counter, connected to said reference clock generator and said control circuit in said luminous signal processing unit, for always counting the reference clocks generated from said reference clock generator, detecting the number of rotation in the internal combustion engine from the count value corresponding to the period of time between the signals outputted from said control circuit on every 2 rotations of the internal combustion engine, and converting the signal determined in terms of the time into the crank angle of the internal combustion engine.

9. An apparatus for detecting combustion timing according to claim 8, further comprising means, connected to said peak detector unit of said processing unit, for detecting the level of the microwave signal from said microwave sensor and checking whether the transmitting and receiving operation of said microwave sensor of said probe means is normal or not, means, connected to said luminous signal processing unit of said processing unit, for detecting the signal level of the luminous signal supplied from said light sensor and checking whether it has a level of processing or not, and means, connected to said microwave oscillator of said microwave unit, for detecting the temperature for the microwave oscillator of said microwave unit and compensating the fluctuation in the output frequency of the microwave oscillator depending on the temperature change, thereby preventing the rise of the temperature in excess of the operative temperature thereof.

10. An apparatus for detecting combustion timing according to claim 2, wherein said peak detector unit of said processing unit detects a pair of peaks which are nearest to the top dead center of said engine.

11. An apparatus for detecting combustion timing according to claim 2, further comprising display means, connected to said processing unit, for displaying the timing for starting combustion with respect to the top dead center thereof based on an output signal of said processing unit.

12. An apparatus for detecting combustion timing according to claim 2, wherein said microwave oscillator of said microwave unit generates a microwave having 18 GHz.

13. An apparatus for detecting combustion timing according to claim 2, wherein said microwave sensor of said probe means radiates the microwave from said microwave unit from a pre-chamber to a main chamber of said engine through a connecting hole thereof.

14. An apparatus for detecting combustion timing according to claim 2, wherein said light sensor of said probe means comprises a photodiode, provided to oppose hole means for supplying light emitted from a pre-chamber of said engine, for converting the detected light to an electric luminous signal.

15. An apparatus for detecting combustion timing according to claim 1, further comprising means, connected to said peak detector unit of said processing unit, for detecting the level of the microwave signal from said microwave sensor and checking whether the transmitting and receiving operation of said microwave sensor of said probe means is normal or not.

16. An apparatus for detecting combustion timing according to claim 1, further comprising means, connected to said luminous signal processing unit of said processing unit, for detecting the signal level of the luminous signal supplied from said light sensor and checking whether it has a level of processing or not.

17. An apparatus for detecting combustion timing according to claim 1, further comprising means, connected to said microwave oscillator of said microwave unit, for detecting the temperature for the microwave oscillator of said microwave unit and compensating the fluctuation in the output frequency of the microwave oscillator depending on the temperature change, thereby preventing the rise of the temperature in excess of the operative temperature thereof.

18. An apparatus for detecting combustion timing according to claim 1, wherein said operating unit of said processing unit further comprises an averaging and statistically processing means for arithmetically averaging the time difference signal, statistically processing the averaged time difference signal to obtain a standard deviation, and confirming the standard deviation to be fallen within a predetermined range.

19. An apparatus for detecting combustion timing according to claim 1, wherein said processing unit further comprises a crank angle converter, connected to said operating unit, for converting the time difference signal operated by said operating unit to a crank angle difference signal based on a predetermined conversion coefficient which is dependent on a speed of said internal combustion engine.

* * * * *